C. R. HUSTED & C. H. McPHERSON.
Circular Saw-Guides.

No. 156,091. Patented Oct. 20, 1874.

WITNESSES:
INVENTOR:
BY
ATTORNEYS.

UNITED STATES PATENT OFFICE.

CALVIN R. HUSTED AND CHARLES H. McPHERSON, OF SOUTHWATER, COLORADO TERRITORY.

IMPROVEMENT IN CIRCULAR-SAW GUIDES.

Specification forming part of Letters Patent No. 156,091, dated October 20, 1874; application filed August 1, 1874.

*To all whom it may concern:*

Be it known that we, CALVIN R. HUSTED and CHARLES H. McPHERSON, of Southwater, in the county of El Paso and Territory of Colorado, have invented a new and useful Improvement in Circular-Saw Guides, of which the following is a specification:

The invention will first be fully described, and then pointed out in the claim.

Figure 1:
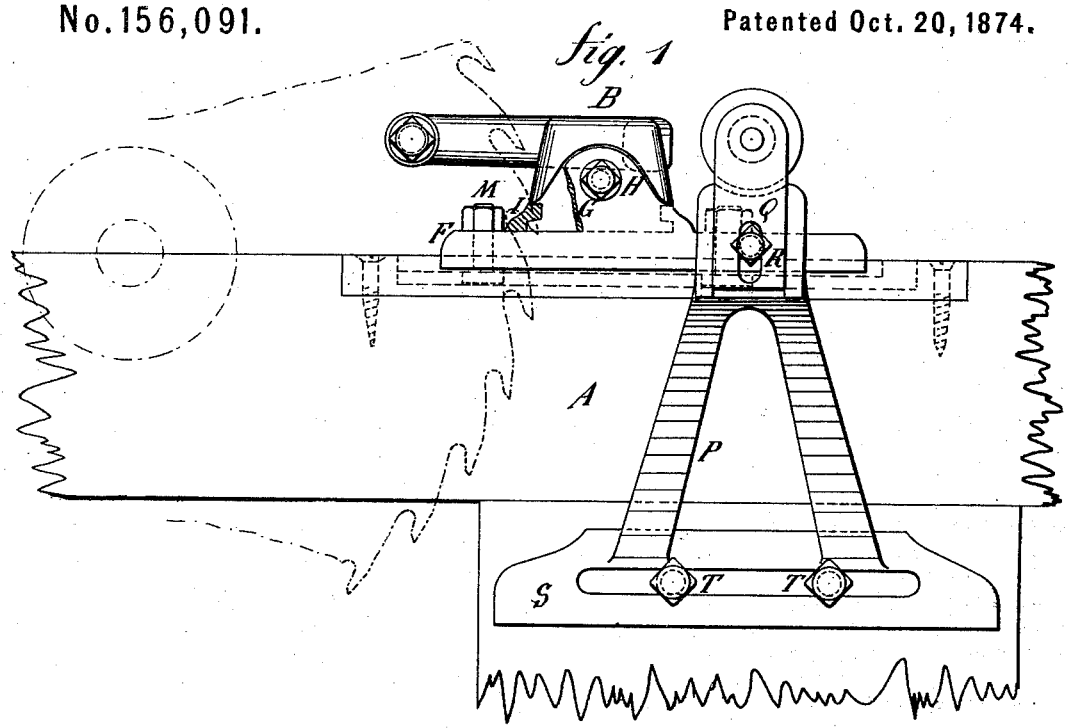
Figure 2:
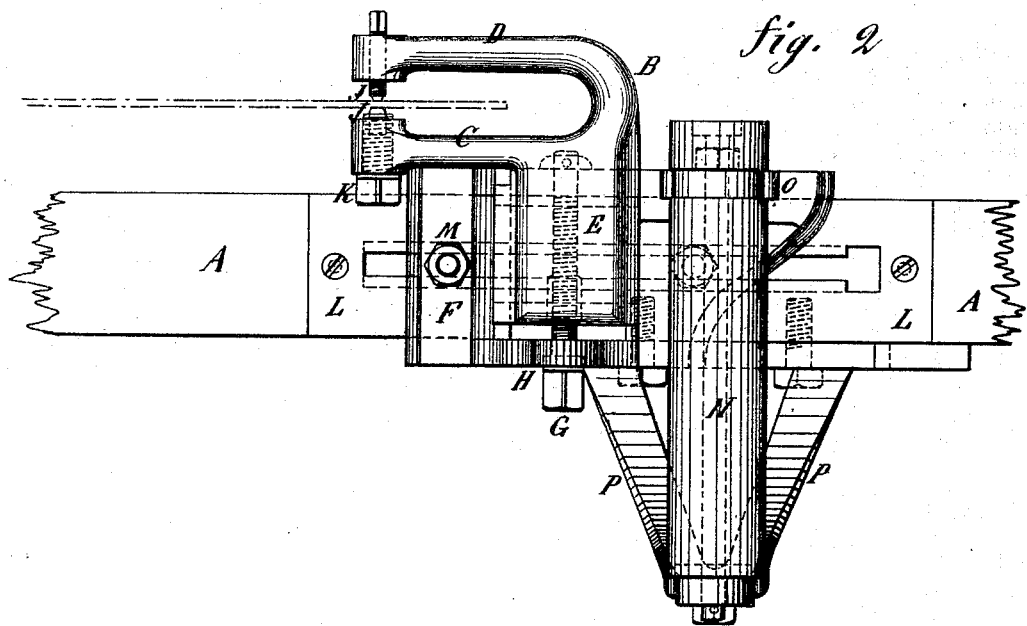

In the accompanying drawing, Figure 1 is a side elevation. Fig. 2 is a top or plan view.

Similar letters of reference indicate corresponding parts.

A is a portion of the saw-frame, to which the guide and roller are attached. B is the guide, consisting of two arms, C and D, and guide-plate E, which latter is made to slide transversely on the adjusting-plate F by means of the screw G through the projecting ears H. This guide-plate is kept in position by the removable cleat I, which is fastened, by screws, to the plate F. The guide-plate E slides on planed bearings, so that it moves easily and true to adjust the arms to the saw. The adjusting-points J J are wood, made adjustable in the ends of the arms C D. One or both of these wood points J may be confined in a hollow metallic screw, as seen at K, if desired. The saw in both these figures is seen in dotted lines. The adjusting-plate F rests on the bed-plate L. The bed-plate is slotted, so that the adjusting-plate F can be moved longitudinally with the saw-frame. M are screws, by which the slide F is held to the bed-plate. On the outer sides of the adjusting-plate F are lip-flanges, which guide the plate F on the bed-plate. N is the supporting-roller. This roller is for the purpose of supporting the overhanging portion of the log, and its upper surface is on a level with the lower surface of the log. This roller is connected with the adjusting-plate F, and, by means of a slotted flange, O, in which it revolves, it is made adjustable as to height, and may be entirely detached from the adjusting-plate F and saw-guide. The other end of this roller is supported by the double brace P. This end of the roller is adjusted vertically by means of the slotted pivot-slide Q on the upper end of the brace, held in position by the screw R. The lower end of the brace is attached to the slotted piece S, which is adjustable horizontally on the frame, and held in position by the screws T.

This saw-guide may be adjusted to the saw with perfect accuracy and with entire safety when the saw is running as well as when it is at rest, and it is done easily and expeditiously at all times.

Having thus described our invention, we claim as new and desire to secure by Letters Patent—

The combination, with saw-frame, of the sliding guide B, slide-plate F, and horizontal roller O, as shown and described, for the purpose specified.

CALVIN R. HUSTED.
CHARLES HENRY McPHERSON.

Witnesses:
H. H. PLATT,
FRED. SCHUYLER.